Jan. 13, 1970  B. A. AMES ET AL  3,488,780
APPARATUS FOR ANTIPOLLUTION OF SEWAGE SYSTEMS AT TOILET SOURCE
Filed June 14, 1967  2 Sheets-Sheet 1

INVENTORS
BLANCHE AMES AMES
EVELYN AMES DAVIS
BY
Kenway, Jenney & Hildreth
ATTORNEYS Jan. 13, 1970   B. A. AMES ET AL   3,488,780
APPARATUS FOR ANTIPOLLUTION OF SEWAGE SYSTEMS AT TOILET SOURCE
Filed June 14, 1967   2 Sheets-Sheet 2

INVENTORS
BLANCHE AMES AMES
EVELYN AMES DAVIS
BY
*Kenway, Jenney & Hildreth*
ATTORNEYS

United States Patent Office 3,488,780
Patented Jan. 13, 1970

3,488,780
APPARATUS FOR ANTIPOLLUTION OF SEWAGE SYSTEMS AT TOILET SOURCE
Blanche Ames Ames, Borderlands, North Easton, Mass. 02356, and Evelyn Ames Davis, 1039 Tyne Blvd., Nashville, Tenn. 37220
Filed June 14, 1967, Ser. No. 646,012
Int. Cl. E03d 1/00, 3/00, 5/00
U.S. Cl. 4—10       8 Claims

ABSTRACT OF THE DISCLOSURE

A system for the disposal of human waste comprising a supply of disposable containers attached in orderly sequence to pairs of cables for positioning the containers for the reception of waste and for transporting the containers to a disposal area is described. The cable-pairs are wound on spools which are individually adjustable to accomplish the opening and closing of the container and its positioning at desired locations. The system is especially adapted for use with conventional toilet systems of the wet-system type.

BACKGROUND OF THE INVENTION

National attention has recently been focused on the problem of disposing of man-made waste, both human and industrial, which has already polluted a substantial portion of the country's potable water supply. In particular, fecal matter, which is the objectionable component of human waste, has heretofore been disposed of mainly in conventional water-activated toilet systems which may carry the fecal matter either to a treatment plant or directly to a discharge point on a river, lake, etc., without treatment. In the latter case, the untreated waste gives rise to serious sanitation problems which have recently been recognized as being at a crisis stage. The discharge of untreated fecal matter into cesspools and similar disposal systems has not avoided the contamination problem since discharge of human waste in this manner causes pollution of underground water sources which in turn feed the usual sources of potable water.

Dry-type toilet systems in which the fecal matter is received for disposition by combustion or similar processes and which are not connected to any of the disposal sources above offer promise of alleviating the sanitation problem. However, dry-type systems are installed in relatively few locations and at present contribute little toward solution of the above problems. Wet-type systems, on the other hand, which contribute most to the sanitation problem, are precisely those systems which, at the present, are the most popular.

Although the replacement of these structures with dry-type structures for the disposition of fecal matter would be desirable, it is unrealistic to expect that the public at large would willingly undertake the complete removal of the wet-type system and its subsequent complete replacement with a dry-type system. In addition, a wet-type system is still advantageous for the disposal of non-contaminating fluids and other waste. It is therefore desirable that conventional wet-type toilet systems be provided with some means of converting them to allow the disposition of fecal matter in a sanitary and non-contaminating manner, while at the same time retaining the structure of the wet-type toilet for other purposes such as disposition of liquid waste products which are generally not considered sources of contamination.

SUMMARY OF THE INVENTION

We have developed apparatus which converts existing wet-type toilet systems into toilet systems which allow the disposal of the solid excreta in a sanitary and non-contaminating manner while preserving the structure of the wet-type toilet for other desired uses such as disposal of liquid waste products. The apparatus of our invention comprises a pre-packed cylindrical roller or drum having a supply of disposable containers attached to pairs of flexible cables wound serially around the drum and holding the containers tightly against the drum. The cables are then passed between the seat and the bowl of the existing wet-type toilet system and are attached on the other side of the bowl to pairs of spools containing one or more driving motors for unrolling the containers from the cylindrical drum and for positioning them over the bowl. In a preferred embodiment of our invention, the containers are opened and closed at appropriate intervals by the relative motion of the drive motors. After waste has been deposited in a container, the container is moved out of the bowl, sealed, and severed from the cables for subsequent disposal by combustion or other means.

Accordingly, it is an object of our invention to provide an improved non-contaminating waste disposal system. A further object of our invention is to provide an improved non-contaminating waste disposal system which may be utilized in combination with existing wet-type toilet systems.

Still a further object of our invention is to provide a non-contaminating waste-disposal system in which the waste is stored in sealed containers for subsequent disposal.

SPECIFICATION

The above and other objects and features of our invention will be more readily apparent when taken together with the following detailed description of the drawings in which.

Figure 1:
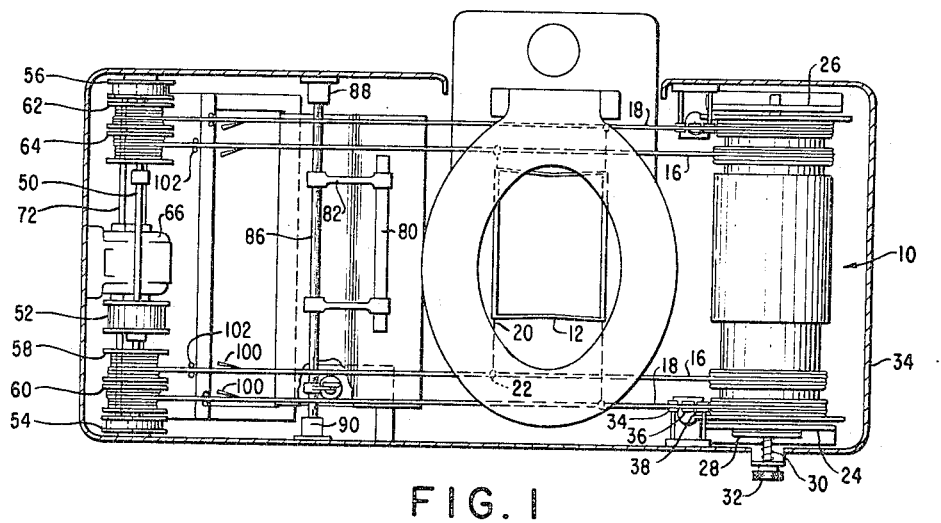
FIG. 1 is a plan view of a preferred embodiment of our invention.
Figure 2:
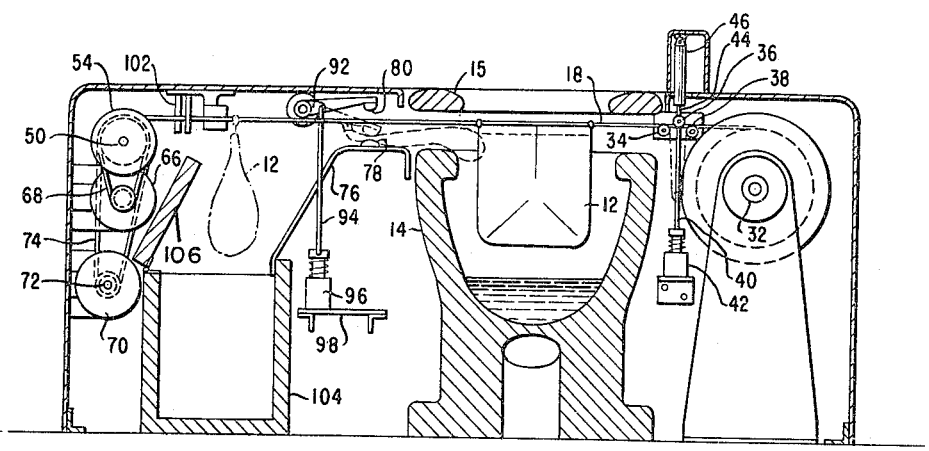
FIG. 2 is a side elevational view in section of the embodiment of FIG. 1.

In FIGS. 1 and 2 of the drawings, which are plan and elevational views respectively of a preferred embodiment of our invention, a cylindrical drum 10 contains a supply of pre-packaged, disposable, folded waste containers 12, one of which is shown in the open position within a toilet bowl 14 of conventional design. The containers 12 are each attached at their front and rear edges respectively to pairs of cables 16 and 18 by means of side supporting filaments 20 extending from the front and rear walls of the container to respective ones of the cables. The containers, which are preferably formed from a flexible, combustible material such as a polyethylene plastic, are wrapped around the drum in a closed condition together with their associated side supporting filaments and cables so they remain relatively flat and conform to the cylindrical shape of the drum when wound on it. For reasons which will be made clear below, the pair of combustible side supporting filaments extending from the rear of the container 12 are passed under the cables 16 before being attached to the cables 18. The filaments are firmly attached to the cables in any of several known ways; in FIG. 1 of the drawings, these filaments are illustratively attached to the cable by means of fastening elements such as the element 22 which may advantageously comprise a globule of plastic which is thermally bonded to the side-supporting filaments and the cables.

The drum 10 is mounted for rotary movement on a pair of supporting pedestals 24 and 26. A friction plate 28 is urged against the drum by means of a spring 30;

the purpose of the friction plate is to provide a restraining force on the drum so that it will not rotate freely but only under a positive driving force as will be described in detail below. A knob 32 is utilized to adjust the pressure with which the plate 28 presses against the cylindrical drum; this knob is mounted on the outside out of a housing which completely surrounds the apparatus of our invention and encloses it within an attractive enclosure.

Positioned adjacent the drum 10 are pulleys 34, 36 and 38 located adjacent the front portion of our system for operation in connection with the frontmost one of the pair of cables 18. A similar set of pulleys is positioned adjacent the rearmost one of the pair of cables 18 for operation in connection with the latter cable. The pulleys 34 and 38 are aligned with each other and are positioned slightly below the cable 18; in contrast, the pulley 36 is positioned above the cable 18 and is attached to both a piston 40 of an electrically actuated solenoid 42 and a piston 44 of a damping element 46. When the solenoid is actuated by an electrical current, the piston 40 is drawn downwardly into the body of the solenoid 42. The pulley 36 is carried downwardly with this piston, but its velocity is limited by the restraining force generated by the damping element 46 which resists any sudden motion of the pulley. The damping element may consist simply of a cylindrical tube having a tightly-fitting piston within the tube and connected to the plunger 44, the tube being substantially airtight except for vent holes at its upper and lower end which permit the intake and exhaust of air at a limited rate to control the speed of the piston 44. This is of the type commonly found in door-closing mechanisms to prevent abrupt closure of doors. The solenoid 42 is spring-loaded so that it returns the pulley 44 to the initial position shown in FIG. 2 when the current input to the solenoid is cut off. It will be noted that the speed of the upward return movement of the pulley is also limited by the damping element 46.

A driving mechanism for the apparatus of our invention is shown positioned on the left side of the bowl. This mechanism comprises a cylindrical shaft 50 on which are concentrically mounted driving spools 52, 54, and 56 and takeup spools 58, 60, 62, and 64. The driving spool 52 and takeup spools 58 and 64 are keyed to the shaft 50 for rotation with it; the driving spools 54 and 56 and takeup spools 60 and 62, on the other hand, are not keyed to the shaft 50 but instead are freely rotatable with respect to this shaft, the driving spool 54 being attached to the takeup spool 60 and the driving spool 56 being attached to the takeup spool 62. The driving spool 52 is actuated by a motor 66 and a driving belt 68 which extends between the motor shaft and the driving spool 52 to cause rotation of this spool and thus of the shaft 50 and the spools 58 and 64. In similar fashion the driving spools 54 and 56 are actuated by a motor 70 via a motor output shaft 72 and a pair of driving belts (one of which is shown at 74) which extend between driving pulleys on the shaft 72 and the driving spools 54 and 56; the latter cause rotation of the takeup spools 60 and 62. With the driving mechanism shown in the drawings, the spool-pairs 58, 64 and 60, 62 may thus be independently driven to establish relative motion of the cables 16 and 18 for reasons which will appear below.

Positioned adjacent the bowl 14 is a platform 76 which has a small semi-cylindrical protuberance 78 firmly positioned on it to serve as an anvil for a sealing bar 80. The bar 80 is attached via arms 82 to a cylindrical shaft 86 which is mounted for rotatable movement in bearings 88 and 90 respectively. The shaft 86 is rotated by means of a rocker arm 92 to which is attached a shaft 94 operated by an electrically-actuated, spring-return solenoid 96. The solenoid 96 is mounted on a shelf 98 which is attached to the inner wall of the housing enclosure 34.

Cutting elements 100 in the form of knives are positioned adjacent the cables 16 and 18 to sever the side supporting filaments and thus release the container from the cables when it is brought adjacent the cutting knives. Pairs of guides 102 in the form of parallel, spaced fingers located on opposite sides of each cable are located directly behind the cutting knives to maintain the cables adjacent the cutting knives and to align the cables with the takeup spools 58, 50, 62 and 64. A receptacle 104 having a hinged cover 106 is positioned directly below the cutting knives to receive the container 12 when it is severed from the cables 16 and 18.

The operation of the embodiment shown in FIGS. 1 and 2 of the drawing may now be understood in detail. In establishing our apparatus for operation, the drum 10 containing a prepackaged supply of containers 12 wrapped around it in successive layers is first positioned on the pedestals 24 and 26. The free ends of the cables 16 and 18 are then drawn off the drum, and the outer cables 18 are drawn through the pulleys adjacent the drum; both pairs of cables are then drawn between the toilet bowl 14 and seat 15 through the guide arms 102, and onto the takeup spools 58, 60, 62 and 64. The motors 66 and 70 are then actuated simultaneously to drive the takeup spools and thereby take up all slack in the cables. The knob 32 is next manipulated to adjust the pressure of the pressure plate 28 against the cylindrical drum 10 so that this drum remains stationary and provides adequate tension in the cables when the motors 66 and 70 are stopped. The apparatus of our invention is now ready for use.

In order to position one of the containers 12 for the reception of waste, the motors 66 and 70 are driven simultaneously to bring a first container 12 from the cylindrical drum 10 into the bowl 14. Since the container 12 is positioned on the drum 10 in closed condition, the front and rear walls of the container must be separated in order to open the container for the reception of waste. This is accomplished by de-activating the motor 70 when the container 12 has been brought to a position within the bowl 14, while continuing the driving power to the motor 66 until the front wall of the container is brought into a position separated from the rear wall and more closely adjacent the left-hand side of the bowl 14. The driving power to the motor 70 is then cut off and the container 12 is then in position for the reception of waste.

When the motor 66 actuates the takeup reels 58 and 64 to draw the cables 16 further to the left than the cables 18, the latter cables are also drawn off the supply drum 10 due to the rotation of the drum. Since the motor 70 is de-activated while the container 12 is being opened, it cannot maintain tension in the cables 18; unless another means of maintaining tension in these cables is provided, therefore, these cables would sag and would allow the rear wall of the container 12 to drop downwardly into the bowl so that the container, instead of having its upper edges approximately in the same plane, would be positioned at an angle to the horizontal. This position is, of course, undesirable and must be avoided.

The necessary tension may be obtained by taking up the slack in the cables 18 when these cables lag behind the cables 16. We accomplish this by inserting the cables 18 in pulley systems containing pulleys which can move at right angles to the cables to take up the slack in the system. As may be seen more clearly from FIG. 2 of the drawing, one such pulley 36 is positioned between and slightly above the adjacent pulleys 34 and 38, the cable 18 riding on the pulleys 34 and 38 and below the pulley 36. The latter is attached to the piston 40 of the solenoid 42 as well as to the piston 44 of the damping element 46 whose function is to exert a restraining force on the motion of the pulley 36 in opposition to any sudden change in position of the pulley. When slack is to be taken up in the cables 18, the solenoid 42 is actuated by supplying electrical current to it to draw the piston 40 downwardly into the body of the solenoid. Due to the presence of the damping element 46 which resists any sudden change in position of the pulley 36, the element 46 generates a force proportional to the downward velocity of the piston 40 and the pulley 36 so that the rate of downward travel is strongly restricted. After a brief time interval, the piston 40 of the solenoid 42 completes its downward travel and no excess slack remains in the cables. The position of the pulley 36 and cable 18 at this time is shown in phantom in FIG. 2 of the drawings.

The container 12 is now properly positioned for the reception of waste. From FIG. 1 of the drawings it will be noted that this container is not fully centered in the bowl but is supported at a location somewhat closer to the rear of the bowl so as to leave an unobstructed opening between the container and the bowl at the forward portion of the bowl. The purpose of this is to allow the discharge of relatively sterile male urine directly into the bowl without hindrance from the container 12 while entrapping non-sterile solid waste products in the container; the liquid waste products of females will, of course, be received directly into the container.

After the container has received the appropriate waste, the container is removed from the bowl by first actuating the motor 70 while simultaneously cutting off the supply of current to the solenoid 42 to disengage this solenoid and thereby release the piston 40 and pulley 36. The upward force supplied by the solenoid spring and that generated by the actuation of the motor 70 is resisted by damping element 46 which limits the upward speed of the pulley 36; this ensures that the rear edge of the container will not suddenly sag on release of the solenoid and allows the motor 70 to take up the slack previously regulated by the solenoid. When this slack is completely taken up, the rear and front edges are positioned immediately adjacent each other and the motor 66 is then actuated to draw in the cables 16 at the same rate as the cables 18 which are driven by the motor 70.

In order to allow the container to be drawn out from between the bowl 14 and the seat 15, the latter should raised in height somewhat from the height customarily found in the conventional toilet apparatus. In practice, we have found that a height of approximately 1½ inches is adequate for this purpose.

From FIG. 2 of the drawing it will be noted that the depth of the container 12 is so chosen that when the upper portion of the container 12 is drawn out between the bowl 14 and the seat 15 and is brought to a position slightly beyond the anvil 78 on the platform 76, the lower portion of the container (into which the waste settles) is still positioned slightly within the bowl 14 so that none of the waste may escape when the container is tilted into the horizontal position shown in phantom in FIG. 2. At this time, the solenoid 96 is actuated by supplying electrical current to it; this causes the retraction of the piston 94 into the body of the solenoid, thus pulling downwardly on the rocker-arm 92 and rotating the heat sealing bar against the anvil 78 and container 12 to seal the mouth of the container as shown in phantom in FIG. 2. Sealing the container in this fashion ensures that its contents do not spill during removal from the bowl or during subsequent handling. Although the heat sealing bar 80 may take any one of numerous forms, it preferably utilizes a resistive electric coil to generate the necessary heat. Of course, the platform 76 may also be positioned to raise the neck of the container slightly above the height of the bowl and thus prevent spillage when the latter is withdrawn from the bowl.

After the container is sealed, it is fullly withdrawn from the bowl by means of the cables 16 and 18 and is transported into the vicinity of the cutting knives 100; the latter sever the side supporting filaments 20 and release the container into the receptacle 104 for subsequent disposal. This receptacle may advantageously contain electrical heating coils to incinerate the container 12 and its contents. We have found that the latter may be completely reduced to sterile ash by raising the temperature inside the receptacle to approximately 2000° F. The ash, which is completely sterile, may be then disposed of by conventional techniques without danger of contamination. Alternatively, the receptacle 104 may be internally refrigerated to quick-freeze the container and its contents for subsequent disposal. After the container 12 is deposited in the receptacle 104, a new container is released from the drum 10 and the cycle is repeated.

As above described, the operation of the apparatus of our invention is semi-automatic in nature, the electrical motors and solenoids being actuated at predetermined time intervals under control of the operator. It will be understood, of course, that the driving mechanism of our invention need not be so restricted and that, for example, the takeup spools 58, 60, 62 and 64 may be actuated by one or more hand-operated winches instead of by motors 66 and 70. Alternatively, one of the motors may be eliminated if other means of opening and closing the waste-receiving containers are provided. Such an alternative is shown in FIGS. 3 and 4 of the drawings which are plan and elevational views respectively, partly in section, of an alternative embodiment of our invention in which like parts have been given like numbers.

Figure 3:
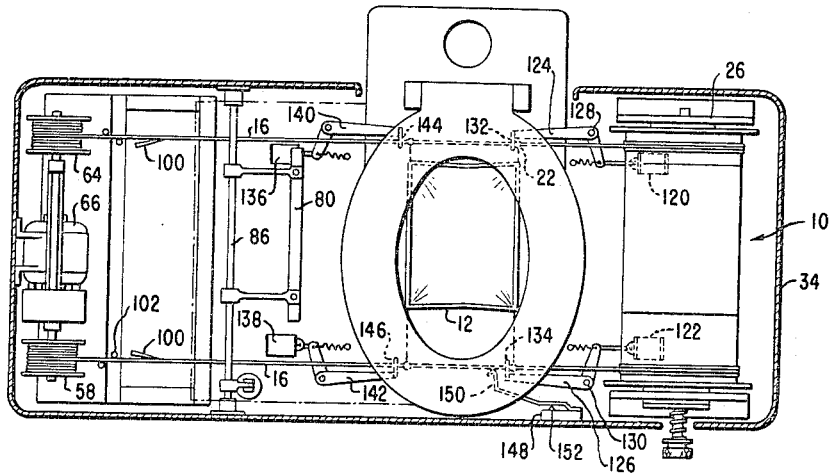
FIG. 3 is a plan view of an alternative embodiment of our invention.
Figure 4:
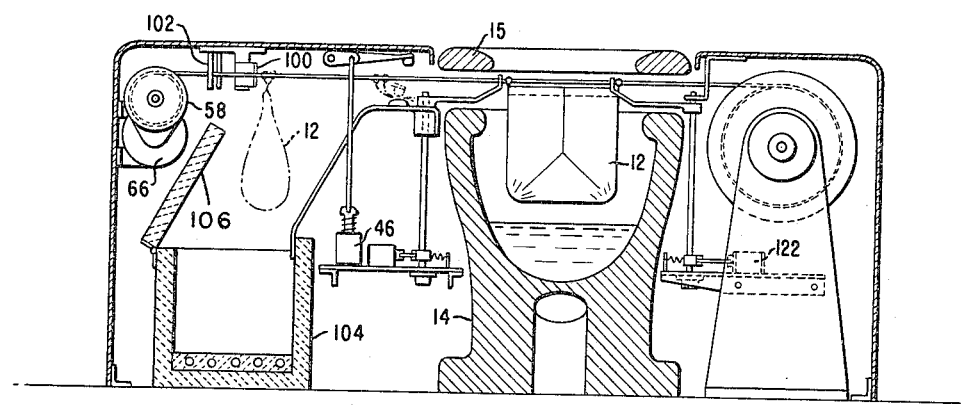
FIG. 4 is a front elevational view in section of the embodiment of FIG. 3.

As shown in FIGS. 3 and 4 of the drawings, the motor 70 of FIGS. 1 and 2 and its associated driving spools 54 and 56 and takeup spools 60 and 62 have been eliminated. Instead, a pair of solenoids 120 and 122 positioned on the right side of the bowl are connected to a pair of bell-cranks 124 and 126 which are pivoted about pivot points 128 and 130 respectively; these bell-cranks terminate in fingers 132 and 134 respectively, these fingers extending outwardly from the bell-cranks 126 and 128 and being adjusted to restrain the movement of the fastening elements 22 when positioned as shown, while allowing the cables 16 to run freely through them. In this embodiment, the fastening elements 22 are only lightly secured to the cables 16 in order that these elements may be moved relative to the cable by the fingers 132 and 134 when these fingers are moved against the cables.

A second pair of solenoids 136 and 138 is positioned on the left side of the bowl 14 and are attached to corresponding bell-cranks 140 and 142 respectively, these cranks terminating in fingers 144 and 146 similar to the fingers 132 and 134. The solenoids 136 and 138 are also shown in the actuated position in FIGS. 3 and 4 of the drawings so that the fingers 144 and 146 extend above and below the cables 16 and immediately adjacent to them in order to restrain the motion of the fastening elements 22.

A switch 148 is positioned in the vicinity of the bell-cranks 128 and 130, and has an arm 150 which rides along one of the cables 16 in order to sense the presence of a fastening element 22. When the motor 66 is actuated to wind the cables 16 onto the takeup spools 58 and 64, an element 22 on the foreward portion of a container 12 passes the switch arm 150 and the arm 150 is moved outwardly of the cable 16 and presses button 152 on the switch to close the switch for operation. This switch is electrically connected to the solenoids 120 and 122 to actuate these solenoids (from a source of electrical energy) to bring the fingers 132 and 134 adjacent the cables 16 when the switch is momentarily closed. The solenoids remain actuated until the foreward portion of the container reaches a position adjacent the left side of the bowl 14 as shown in the drawings; during this time the fingers 132 and 134 restrain the movement of the elements 22 on the rear portion of the container so that the walls of the container are effectively separated from each other and the container is opened. The motor 66 is then stopped and the solenoids are de-actuated.

After waste has been deposited in the container 12, the solenoids 136 and 138 are actuated by supplying electricity to them and the motor 66 is again actuated to drive the cables 16. The solenoids bring the fingers 144 and 146 adjacent the cables 16 and prevent the movement of the elements 22 on the foreward portion of the container when the motor 66 is actuated. The motion of the elements 22 is thereby retarded with respect to the cables until the rear portion of the container is carried to a position adjacent the front portion by means of the cables 16. At this time, the container has been fully closed and the solenoids 136 and 138 are de-actuated to allow the fastening elements 22 to move along with the cable and carry the container 12 out from the bowl and into position for heat sealing by means of the bar 80. The container is then drawn against the cutting knives 100 and deposited in the receptacle 104 for subsequent treatment and disposal as was previously the case.

From the above it will be apparent that we have provided an improved non-contaminating waste disposal system. Fruther, we have provided such a system in a form which can readily convert a conventional wet-type toilet system into a sanitary disposal system in which individually disposable containers are utilized to receive contaminating waste while preserving the use of the toilet for the disposal of non-contaminating solids or liquids.

Having illustrated and described a preferred embodiment of our system, what we claim is new and desire to secure by Letters Patent is:

1. In combination with a conventional wet-type toilet system having a bowl and a seating means positioned on said bowl, the improvement consisting of apparatus for the disposal of human waste, said apparatus comprising, in combination,
   (A) a plurality of preformed disposable containers for said waste, each said container having a pair of walls movably positionable with respect to each other for opening and closing said container,
   (B) means for storing said containers in prearranged order,
   (C) a conveyor system including a driving means and at least one pair of conveyor elements movably extensible between said storage means and said driving means, said conveyor elements being positioned intermediate said bowl and said seating means and being connectable to said driving means for actuation thereby,
   (D) means for attaching each said container to said conveyor elements in spaced relation to each other,
   (E) said driving means being actuable to remove each said container in sequence from said storage means and to position each said container above said bowl for the reception of human waste, said driving means being thereafter actuable to remove each said container to a predetermined location for disposal, and
   (F) means for opening and closing each said container in predetermined sequence,
   (G) said container storage means, said driving means, and said conveyor system being disposed adjacent said bowl to provide substantially unimpeded access to said bowl when a container is not positioned therein, whereby said system may be used as a conventional wet-type toilet system when desired.

2. The combination defined in claim 1 in which said conveyor system includes first and second pairs of conveyor elements selectively movable with respect to each other, one of said container walls being attached to said first pair of conveyor elements and a second of said walls being attached to said second pair of conveyor elements, the selective motions of said pairs of conveyor elements with respect to each other being operative to effectuate the opening and closing of each said container by moving said walls away from or toward each other respectively.

3. The combination described in claim 2 in which each said conveyor element comprises a flexible cable and in which said driving means includes a driving motor and first and second cylindrical drums individually actuable by said motor for winding said cables thereon, whereby a translational motion may be imparted to said containers by said cables when said drums are actuated.

4. The combination described in claim 3 in which said means for storing said containers comprises a cylindrical drum on which said cables and said containers may be wound, said drum being rotatable to release said cables and the containers attached thereto when said cables are driven by said driving means.

5. The combination described in claim 4 in which said means attaching said containers to said cables comprises combustible filaments for supporting said container between said cables.

6. The combination described in claim 5 which includes means for maintaining tension in one of said pairs of cables when said pairs are moved relative to each other to open each said container, said means being releasable when said pairs of cables are again moved relative to each other to close said container.

7. The combination described in claim 4 which includes heat-sealing means positioned adjacent said bowl for sealing each said container after waste has been deposited therein whereby said container may be completely sealed before disposal.

8. The combination described in claim 1 in which said conveyor system includes a pair of conveyor elements to which said container walls are attached, and in which said means for opening and closing each said container in predetermined sequence includes first and second pairs of guide arms, said arms being selectively actuable to retard the motion of said pair of walls with respect to each other at selected moments to thereby effectuate the opening and closing of each said container.

References Cited

UNITED STATES PATENTS

| | | | |
|---|---|---|---|
| 228,313 | 6/1880 | Climie | 4—11 |
| 565,479 | 8/1896 | Maclay et al. | 4—142 |
| 1,181,590 | 5/1916 | Gresham | 221—83 |
| 1,341,408 | 5/1920 | Armstrong | 53—191 |
| 1,446,256 | 2/1923 | Lane et al. | 4—142 |
| 1,996,325 | 4/1935 | Cox. | |
| 2,671,906 | 3/1954 | Potts | 4—111 |
| 2,678,450 | 5/1954 | Simpson et al. | |
| 2,768,386 | 10/1956 | Graef et al. | |
| 2,794,989 | 6/1957 | Pellerito et al. | 4—135 |
| 3,032,776 | 5/1962 | Obert et al. | |
| 3,059,597 | 10/1962 | Wood | 4—131 |
| 3,092,049 | 6/1963 | Wood. | |
| 3,217,954 | 11/1965 | Grant et al. | 221—70 |

LAVERNE D. GEIGER, Primary Examiner

D. B. MASSENBERG, Assistant Examiner

U.S. Cl. X.R.

53—187